US008293296B2

(12) United States Patent
Jacobsen et al.

(10) Patent No.: US 8,293,296 B2
(45) Date of Patent: Oct. 23, 2012

(54) METHOD OF PRODUCING POPCORN CONFECTIONERY AND MACHINE FOR USE WITH THE METHOD

(75) Inventors: Kim Jacobsen, Jystrup (DK); Karsten Jørgensen, Nakskov (DK)

(73) Assignee: Double Pop License APS, Jystrup (DK)

( * ) Notice: Subject to any disclaimer, the term of this patent is extended or adjusted under 35 U.S.C. 154(b) by 780 days.

(21) Appl. No.: 12/309,282

(22) PCT Filed: Jul. 13, 2007

(86) PCT No.: PCT/DK2007/000359
§ 371 (c)(1),
(2), (4) Date: Jan. 13, 2009

(87) PCT Pub. No.: WO2008/006378
PCT Pub. Date: Jan. 17, 2008

(65) Prior Publication Data
US 2010/0112140 A1    May 6, 2010

(30) Foreign Application Priority Data
Jul. 14, 2006  (DK) ................................ 2006 00977

(51) Int. Cl.
*A23G 3/00*    (2006.01)
(52) U.S. Cl. .......................................... 426/93; 426/274
(58) Field of Classification Search .................... 426/93, 426/274
See application file for complete search history.

(56) References Cited

U.S. PATENT DOCUMENTS

| 2,181,109 A | 11/1939 | Dodge |
| 3,843,814 A | 10/1974 | Grunewald-Kirstein |
| 3,950,567 A | 4/1976 | Tomlinson |
| 4,652,456 A | 3/1987 | Sailsbury |
| 2002/0064581 A1 | 5/2002 | Jensen et al. |
| 2003/0232119 A1 | 12/2003 | Popov |

FOREIGN PATENT DOCUMENTS

| DE | 558520 | 8/1932 |
| DE | 33 35 781 A1 | 4/1985 |
| DE | 195 46 654 C1 | 5/1997 |
| DK | 79880 | 9/1955 |
| WO | WO 00/60954 | 10/2000 |

OTHER PUBLICATIONS

Bush et al, Skuse's complete confectioner, 1957, Thirteenth Edition, Published by WJ Bush and Company , pp. 36-39 and 306-309.*
June Roth, Old Fashioned Candymaking, 1974 Edition, Published by Henry Regnery Company Chicago, pp. 16-21 and 144-151.*

* cited by examiner

*Primary Examiner* — Jyoti Chawla
(74) *Attorney, Agent, or Firm* — Nath, Goldberg & Meyer; Jerald L. Meyer; Robert T. Burns

(57) ABSTRACT

By the method of producing popcorn confectionery a first sugar/glucose substance is produced. This substance is boiled at 170 -210°C for approx. 3-10 hours until the substance is dark brown/black and viscous, whereafter it is cooled down. Hereafter a second sugar/glucose substance is produced, which is boiled at 100-130°C for approx. 1-10 hours. The first substance and the second substance are mixed at a weight ratio of 1:2-1:6, whereafter the resulting mixture is boiled and popcorn is added. This mixture can be formed in formed pieces in a machine 1 including a cylindrical, horizontal buffer tank 3, which is surrounded by a chamber 11 filled with oil, and a cylindrical, horizontal main tank 2 surrounded by a chamber 23 filled with oil.

4 Claims, 2 Drawing Sheets

METHOD OF PRODUCING POPCORN CONFECTIONERY AND MACHINE FOR USE WITH THE METHOD

TECHNICAL FIELD

Figure 1:
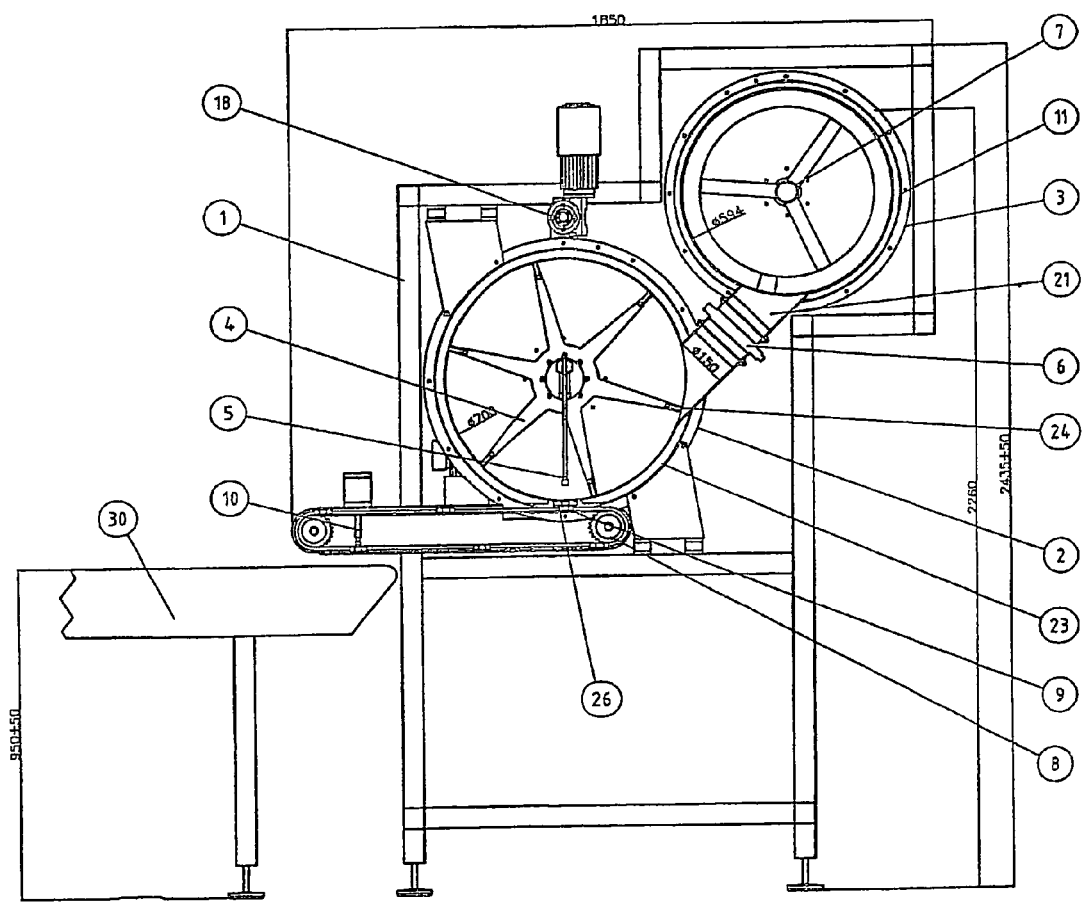

The present invention relates to a method of producing popcorn confectionery and a machine for use with the method.

PRIOR ART

Popcorn is a very popular and low-priced commodity available at large quantities and furthermore having some nutritive value. Thus popcorn is an obvious choice for a commodity to be used by the confectionery industry.

Thus various methods are known, where popcorn in separate pieces is coated with caramel and/or chocolate.

DE Patent No. 558.520 (Richard Neufeld) discloses a method of producing popcorn with a caramel coating, where the grains of popcorn are first coated with sugar in a sugar-coating boiler adapted for this purpose, whereafter the coated grains of popcorn are heated to approx. 145-165° C. in another tank, whereby caramelisation takes place. After having been taken out and cooled down, the caramelised grains of popcorn can easily be separated from each other.

DE Publication No. 33 35 781 (Helmut Haase) also discloses a method of producing caramelised or sugar-glazed popcorn, where first a melted mixture of fat or oil with sugar is prepared at a temperature of approx. 250° C. Then non-popped grains of popcorn are added to this mixture until they pop.

U.S. Pat. No. 2,181,109 (Mary N. Dodge) discloses a method of coating popcorn with a sealing coating, such as a candy syrup, whereafter the grains of popcorn are dipped into melted chocolate after hardening of the coating.

The above documents refer to the production of separate grains of coated popcorn. Formed pieces, however, are preferred not only by consumers but also by producers as packaging, distribution and pricing are made easier thereby.

U.S. Pat. No. 3,950,567 (Barnard E. Tomlinson) discloses a method of producing non-sticky popcorn confectionery by cooking sweetener, fat, water and gelatine and subsequently pouring the boiling mixture over the popped popcorn to make popcorn balls.

U.S. Pat. No. 4,652,456 (Lowell W. Salisbury) describes a method of producing popcorn balls, where the popped popcorn is first coated with a caramel coating and then cooled down, so that the caramel coating becomes hard and non-sticky, whereafter a predetermined quantity of the cold, coated popcorn is apportioned in a form. The popcorn is heated in the form until the coating becomes soft and sticky, whereafter the coated popcorn is compressed into balls which are then cooled down in the form until the coating becomes hard. Subsequently the compressed popcorn balls are taken out of the form.

Furthermore DK Patent No. 79880 (Verner Jacobsen) discloses a method of producing popcorn confectionery by sticking together the grains of popcorn with a sugar substance, where the popcorn is mixed with a caramel substance at approx. 150° C., whereafter the mixture is cooled down and cut into suitable pieces. Subsequently these pieces are coated with a chocolate coating.

The disadvantage of this known method is that, after mixing the caramel substance with popcorn, the resulting mixed substance very quickly dries out, even when disposed to stable heat, whereby the substance becomes very difficult to work with, and the finished product becomes very fragile and friable. This fast dehydration is probably due to the high content of dry matter of the popcorn and as a result the mixed popcorn/caramel substance can not be processed further by machine.

Thus the object of the present invention is to provide a method of producing popcorn confectionery, where the above problem of too fast dehydration is avoided, whereby further processing by machine of the substance is made possible and thus more rational production is made possible.

DISCLOSURE OF INVENTION

This is achieved by the method according to the invention, which is characterised in that
i) a first sugar/glucose substance is produced, which is boiled at 170-210° C. for approx. 3-10 hours or until the substance has become dark brown/black and viscous, whereafter the mixture is cooled down,
ii) a second sugar/glucose substance is produced, which is boiled at 100-130° C. for approx. 1-10 hours,
iii) the first substance is mixed with the second substance at a weight ratio of 1:2-1:6, whereafter the mixture is heated until the "crack stage" is reached, i.e. until 140-160° C., and is mixed with the popcorn,
iv) the resulting substance is processed further to form individual pieces of an appropriate size in a confectionery machine adapted for this purpose, and
v) the pieces are cooled down.

Advantageously, further processing takes place in a machine adapted for this purpose, where the substance is formed into individual pieces of an appropriate size.

If desired, these pieces may be coated with a chocolate coating. This provides the product with sound keeping qualities and furthermore provides a good taste combination.

It is known to produce formed pieces of chocolate by laying down the substance as a carpet, which is rolled out and then chopped or cut into the formed pieces desired, which are then fed on to a chocolate coating machine. This, however, cannot be done with a substance containing popcorn as the popcorn would blast like glass when cut into pieces if the substance is cold. If the substance is warm when cut, the sugar/glucose substance is simply stuck together again after the cutting process.

Figure 2:
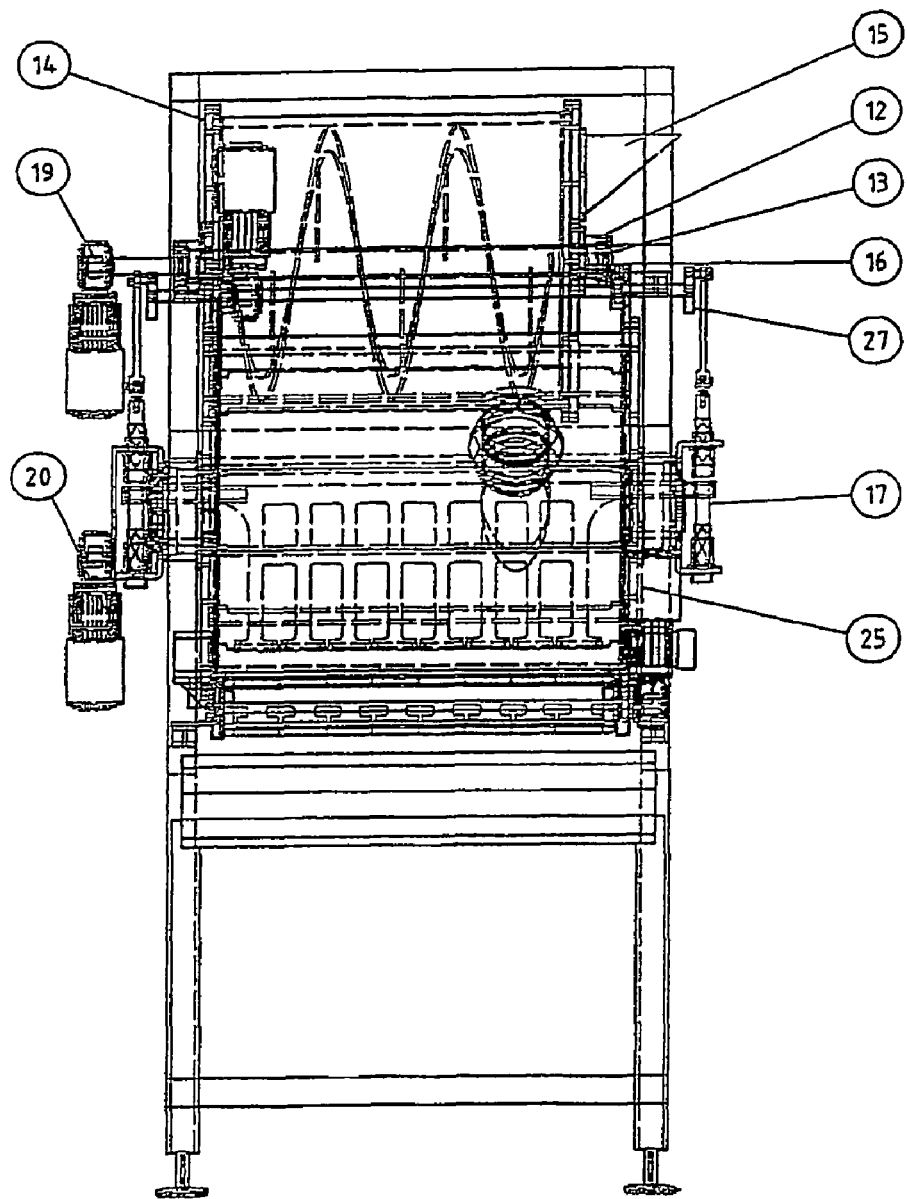

The invention also relates to a machine for use on applying the method concerned. The machine according to the invention is shown in the drawing, where FIGS. 1 and 2 show the machine from the front and from the side, respectively.

The machine according to the invention is characterised in that
it includes a cylindrical, horizontal buffer tank 3 surrounded by a heating chamber 11, said buffer tank including a worm 7 for stirring the mixture of popcorn and sugar/glucose and feeding the mixture to a discharge pipe 21,
the buffer tank 3 via a valve 6 in the discharge pipe 21 is connected to a cylindrical, horizontal main tank 2 surrounded by a heating chamber 23, said main tank including a stirring device 4 with a plurality of blades 24 operated by a gear motor 18,
at the bottom of the main tank 2 an exchangeable flange 26 is placed, whereby the geometry of the formed pieces may be changed, said flange containing a plurality of holes through which the substance is pressed down into the forms 9 by means of a vertically operated piston 5,
the forms 9, which include a plurality of cavities for the formed pieces, are fed by means of an index face 8, and the formed pieces are discharged by ejection in the appliance 10 at the opposite side of the index face 8 and are dispensed into the reception tray 30 for further handling.

In the machine according to the invention the buffer tank 3 is fed trough a funnel 15 in one of the detachable end covers 14.

The worm 7, which is operated by a gear motor 14, rotates in bearings 13 assembled in bearing housings 12. These bearing housings 12 are sealed with a heat-resistant proofing 16.

The stirring device 4 in the main tank 2 is fastened to the end covers 25 and operated by a gear motor 20.

The vertically operated piston 5, which is supported by piston shears 17, is moved up and down by means of a motorised eccentric appliance 27.

The present invention provides a machine which makes the production of homogeneous formed pieces with a relatively large content of popcorn possible, as both the buffer tank and the main tank can be heated so that the mixture of popcorn and sugar/glucose is maintained heated so that it does not dry up, and that the machine keeps the mixture of popcorn and sugar/glucose in constant motion, so that the sugar substance stays evenly spread on the grains of popcorn without the grains of popcorn being smashed to pieces. Thus the stirring impact needs to be relatively gentle, of course. The mixture is added to the cavity of the form, in a heated state, and thus it can easily be compressed without the grains of popcorn breaking. When the mixture has become cold, it can easily be removed from the form cavity. Subsequently the formed pieces are fed on for further handling such as applying a chocolate coating.

According to a particularly advantageous embodiment of the invention, the main tank of the machine, being a cylindrical cavity with a perpendicular cross section and with a horizontal central axis, can include stirring means in the form of phased revolvable blades made to rotate around the central axis of the cylindrical cavity. Hereby the stirring becomes particularly gentle.

Furthermore the discharging, i.e. the ejection of the formed pieces from the form cavities, is effected by the impact of a rectlinear reciprocating piston device having a cross section corresponding to the output opening and being adapted to move to and from synchronously with the stirring means. Hereby an efficient apportioning of the mixture is ensured.

The starting position of the piston appliance is in such a position that the pistons close the openings at the bottom of the main tank. Below the main tank an index face is placed, said index face feeding a plurality of forms, each form having a plurality of cavities, typically 8-16 cavities. The form is fixed exactly outside the openings at the bottom of the main tank, which at the same time is pressed upwards towards the flange at the bottom of the tank to provide for sealing. The pistons are directed to their top position, whereafter the stirring device is turned e.g. 60°. Hereby the mixture of popcorn and sugar/glucose is fed forward and down into the openings. Then the pistons are pressed down with the exact power/way by which the formed pieces are created. The pistons are directed back to the start position, and the index face is adjusted in relation hereto.

The discharging takes place with the same index when the form has rotated 180°. This is done mechanically, either by means of air or by, means of a motordriven piston function.

The form in the machine according to the invention may include a circle cylindrical shell with a plurality of cavities made by slots formed in the shell, such slots in the inwardgoing direction being defined by the piston appliance constituting the bottom. This has been adapted to be activated for discharging of the formed piece in the appliance at the opposite side of the index face and for ejection for further handling in the reception tray. The form is adapted to be moved around its centre axis synchronously with the movement of the output means and the stirring means. Hereby a particularly advantageous embodiment of the form is achieved in the machine, which ensures easy access for the mixture from the main tank to the form cavity.

The very ejection of the formed pieces for further handling advantageously takes place by the piston appliance constituting the bottom having a piston rod extending radially towards the centre of the form, and whose interior end abuts a centrally placed collar device ensuring the mentioned ejection of the formed piece in the appliance at the opposite side of the index face.

DETAILED DESCRIPTION OF THE INVENTION

The invention is explained more detailed below with reference to the drawings, in which FIG. 1 shows a preferred embodiment of a machine according to the invention seen from the front, and FIG. 2 shows the same embodiment of the machine seen from the side.

By dividing the caramel substance into two portions, which are produced at different temperatures, it is surprisingly achieved that the caramel substance does not dry out as quickly after having been mixed with the grains of popcorn, as when the mixing of popcorn is effected with a traditionally produced substance at approx. 150° C., cf. the above DK Patent No 79880. Thus it is possible to process the caramel/popcorn substance produced by the method according to the invention for at least one hour after mixing at constant heat, which must be compared to a time possible for processing of only approx. 10 minutes for the caramel/popcorn substance produced according to DK Patent No 79880.

With the method according to the invention, a first sugar/glucose substance is produced, which is boiled at 170-210° C., preferably at 180-200° C., for approx. 3-10 hours, such as approx. 6 hours, or until the substance has become dark brown/black and viscous, whereafter the substance is cooled down to approx. 100° C.-120° C. Alternatively this substance may be cooled down to a lower temperature, such as room temperature, and be left for some days until it is mixed with the second substance. Concurrently the second sugar/glucose substance is produced, which is boiled at 100-130° C., preferably at 110-120° C., for approx. 1-10 hours, such as 6 hours. Thereupon the two substances are mixed at a weight ratio of 1:2 to 1:6, preferably at approx. 1:4, whereafter the mixing is boiled until the "crack stage" is reached, i.e. at 140-160° C., and mixed with an appropriate quantity of popcorn.

The space of time for boiling substance i) and substance ii) respectively, is not so crucial and it is usually adjusted to the applied temperature as well as to how weak or strong a boiling is effected.

The production of the two substances i) and ii) can take place the conventional way, e.g. by heating in suitable containers applying electricity, steam or gas or by applying pressure cookers.

The temperature, at which the grains of popcorn are mixed with the caramel substance, depends on the composition of the caramel substance and the corn species applied. In general, it can be said that it must not exceed approx. 160° C., as otherwise the grains of popcorn will get too distinct a caramel taste and furthermore they may shrink. At the same time it must not fall to below approx. 140° C., as in that case the grains of popcorn will not be sufficiently crunchy.

Thus it is important to effect a heating to the so-called "crack stage" at 137-138° C., as the substance does not get crunchy but tough, if this temperature is not reached.

For both substances concerned, the caramel substance typically consists of approx. 2 parts by weight of sugar per part by weight of glucose as well as usually a certain amount of water to avoid that the substance sticks to the container during heating. The weight relation between the two substances i) and ii) is in the interval from 1:6 to 1:2, preferably approx. 1:4. If a large quantity of substance i) is used in relation to substance ii), the mixed substance becomes sticky and thus difficult to work with, and if a large quantity of substance ii) is used in relation to substance i), the resulting mixed caramel substance becomes too dry and too loosely coherent.

On mixing with the grains of popcorn, approx. 2-5 liters of popcorn are used per liter of total sugar/glucose substance, all depending on the type of popcorn used. Thus, in practice it is necessary to adjust the amount of the sugar/glucose substance according to the used type of popcorn in order to obtain an optimum mixture ratio.

The resulting substance can advantageously be processed further in the machine shown in FIGS. 1 and 2. This machine 1 includes a cylindrical, horizontal buffer tank 3 surrounded by a chamber 11 filled with oil, whereby the buffer tank can be heated to a maximum of 120° C. This heating takes place by means of a plurality of electric heating elements. The buffer tank 3 is filled through a funnel 15 in the one end cover. The two end covers 14 may be dismounted for the sake of maintaining the machine. In the buffer tank 3 a worm 7 is placed, said worm partly serving to stir the substance and partly serving to feed the substance to the discharge pipe 21 of the tank. The worm, which is operated by a gear motor 19, rotates in bearings 13 assembled in bearing housings 12 sealed with a heat-resistant proofing 16.

Via the discharge pipe 21 the buffer tank 3 is connected to the main tank 2 of the machine via a manually or automatically adjusted valve 6. The main tank 2 is cylindrical and horizontal, and it is surrounded by a chamber 23 filled with oil, whereby it can be heated to a maximum of 120° C. This heating takes place by means of a plurality of electric heating elements. A stirring device 4 with a plurality of blades 24 is placed in the main tank, said stirring device being operated by a gear motor 18. This stirring device is fastened to the end covers 25 and is operated by a gear motor 20 by a chain drive. At the bottom of the tank an exchangeable flange 26 is placed for the purpose of making it possible to change the geometry of the formed pieces. In the flange a plurality of holes is placed, through which the mixed substance is pressed down in the forms 9. This takes place by means of a vertically operated piston 5 supported by means of piston shears 17 and moved up and down, either by a motorised eccentric appliance 27 or by means of spindles operated by servo or step motors.

The forms 9, which include a plurality of cavities for the formed pieces, e.g. 8-16 or more cavities, are fed by means of a chain driven index face 8. The forms are fixed in a way not specified any further, as the fixing is to be exactly outside the bottom flange of the main tank.

The formed pieces produced are discharged from the forms in the ejection appliance 10 at the opposite side of the index face 8, i.e. rotated by 180° in relation hereto. This takes place simultaneously in the same index as the pressing of the formed pieces.

The formed pieces are caught in the reception tray 30, and the further handling of the formed pieces, such as coating of them by chocolate, may be effected by methods not described any further, or by means of appliances not shown in the figures.

Above, the invention has been described with reference to a preferred embodiment of the machine. A plurality of changes and modifications of this embodiment can be made without departing from the idea of the invention.

A great advantage of the method referred to is that it makes it possible to process the produced popcorn/caramel substance further by machine. This provides the option of rational and profitable popcorn confectionery.

The coating with chocolate of the produced popcorn/caramel substance gives a good taste combination greatly appreciated by consumers. Apart from the tasterelated advantages the coating with chocolate has the effect that the highly absorbent caramel substance is prevented from absorbing water which otherwise would cause the coherent pieces to flow out again. This way it is ensured that the product has good keeping qualities.

If desired, other ingredients may be contained in the popcorn confectionery according to the invention as well, such as e.g. desiccated coconut, raisins, nut products etc. If large amounts of such other ingredients are used, it may be appropriate to adjust the quantity of the grains of popcorn correspondingly so that a sufficient coating of these ingredients with the caramel substance is ensured.

The formed pieces of popcorn confectionery produced according to the invention are of a particularly good taste and crunchy consistency, and with air tight packaging of the formed pieces it is achieved at the same time that they obtain good keeping qualities.

The invention is illustrated more detailed by the following example.

EXAMPLE

This example illustrates the method according to the invention for producing popcorn confectionery.

Two sugar/glucose substances i) and ii) are produced with the following compositions:
Substance i):
3 kg glucose 84°
7.5 kg sugar
5 kg water
Substance ii):
12 kg glucose 84°
30 kg sugar
20 kg water The ingredients mentioned under substance i) are mixed in a container and boiled at approx. 180° C. for approx. 6 hours under frequent stirring.

At the same time the ingredients mentioned under substance ii) are mixed in a container and boiled at approx. 110-120° C. for approx. 6 hours under frequent stirring.

Hereafter substance i) and substance ii) are mixed, and the mixture is quickly heated to approx. 140° C. When this has happened, the caramel substance is mixed with the popped popcorn of the White Hulles type at a volume ratio of 1 liter of caramel substance to 3.75 liter of popcorn.

In the same way as described above, popcorn confectionery pieces were produced in a machine as shown in FIGS. 1 and 2, after cooling down to room temperature said popcorn confectionery pieces were coated with chocolate of the Callebaut 823 type (milk chocolate) and the Callebaut 1815 type (dark chocolate).

The invention claimed is:
1. Method of producing popcorn confectionery, comprising the steps of:
dividing a sugar/glucose substance into a first sugar/glucose substance and a second sugar/glucose substance;

boiling the first sugar/glucose substance at 170-210° C. for approximately 3-10 hours or until the substance has become dark brown/black and viscous, then cooling the mixture;

boiling the second sugar/glucose substance at 100-130° C. for approximately 1-10 hours;

mixing the first sugar/glucose substance with the second sugar/glucose substance at a weight ratio of 1:2-1:6;

heating the mixture until the "crack stage" is reached, i.e. until 140-160° C.;

mixing the mixture with popcorn;

further processing the resulting substance to form individual pieces in a confectionery machine; and cooling the pieces.

2. Method according to claim 1, further comprising the step of mixing the first sugar/glucose substance with the second sugar/glucose substance at a weight ratio of 1:4.

3. Method according to claim 1, further comprising the step of mixing the mixed first and second sugar/glucose substances with popcorn at a volume ratio of between 1:2 and 1:5.

4. Method according to claim 1, further comprising the step of covering the cooled pieces with melted chocolate.

* * * * *